US012758924B2

(12) United States Patent
Wang et al.

(10) Patent No.: US 12,758,924 B2
(45) Date of Patent: Oct. 13, 2026

(54) METHOD OF PREPARING FLEXIBLE CERAMIC MEMBRANE BY COMBINING MANGANESE OXIDE WITH LAYER-BY-LAYER ASSEMBLY TECHNOLOGY

(71) Applicant: Harbin Institute of Technology, Harbin City (CN)

(72) Inventors: Panpan Wang, Harbin (CN); Yajuan Cai, Harbin (CN); Jun Ma, Harbin (CN); Junda Yi, Harbin (CN); Han Wang, Harbin (CN)

( * ) Notice: Subject to any disclaimer, the term of this patent is extended or adjusted under 35 U.S.C. 154(b) by 0 days.

(21) Appl. No.: 19/094,802

(22) Filed: Mar. 28, 2025

(65) Prior Publication Data

US 2025/0249412 A1 Aug. 7, 2025

(30) Foreign Application Priority Data

Feb. 1, 2024 (CN) ......................... 202410148440.5

(51) Int. Cl.

*B01D 67/00* (2006.01)
*B01D 69/02* (2006.01)
*B01D 69/10* (2006.01)
*B01D 69/12* (2006.01)
*B01D 71/02* (2006.01)

(52) U.S. Cl.

CPC ..... *B01D 67/0069* (2013.01); *B01D 67/0095* (2013.01); *B01D 69/02* (2013.01); *B01D 69/105* (2013.01); *B01D 69/107* (2022.08); *B01D 69/125* (2013.01); *B01D 71/024* (2013.01); *B01D 2323/081* (2022.08);

(Continued)

(58) Field of Classification Search

CPC .............. B01D 67/0069; B01D 69/107; B01D 67/0095; B01D 69/02

See application file for complete search history.

(56) References Cited

U.S. PATENT DOCUMENTS

| | | | | |
|---|---|---|---|---|
| 11,746,026 | B1 * | 9/2023 | Yang | B01D 65/08 210/650 |
| 2022/0388922 | A1 * | 12/2022 | Su | B01J 20/205 |
| 2023/0249138 | A1 * | 8/2023 | Ehlen | B01D 67/00411 |

* cited by examiner

*Primary Examiner* — Nathan T Leong

(74) *Attorney, Agent, or Firm* — Novoclaims Patent Services LLC; Mei Lin Wong

(57) ABSTRACT

A method of preparing a flexible ceramic membrane by combining manganese oxide with layer-by-layer assembly technology, which belongs to the field of drinking water purification and wastewater pollution control, is used to solve the problems of poor hydrophilicity of existing organic membranes and high cost of ceramic membranes prepared using organic membranes. The advantages of the polyelectrolyte layer's anti-chlorination property is utilized to acquire the advantages of flexible ceramics, thereby solving the problems of poor hydrophilicity and high cost of existing organic membranes. The binding force of positive and negative charges is utilized for intercepting colloidal substances in water so as to solve the problem of fouling. Therefore, a foundation for its research in the field of drinking water purification and wastewater pollution control is laid. The method includes (a) pretreatment of organic membrane, (b) preparation of preformed solution, (c) introduction of polar groups, (d) preparation of polycationic (Continued)

coating solution, (e) preparation of coating solution A and B, (f) in-situ layer-by-layer assembly, (g) repetition of (f), and (h) drying and storing in deionized water.

10 Claims, 3 Drawing Sheets

(52) U.S. Cl.
CPC ...... *B01D 2323/12* (2013.01); *B01D 2323/40* (2013.01); *B01D 2325/24* (2013.01)

| | C | O | F | Mn |
|---|---|---|---|---|
| 1 | 59.5% | 2.6% | 37.9% | 0.0% |
| 2 | 64.0% | 2.8% | 32.9% | 0.3% |
| 3 | 63.9% | 2.4% | 33.3% | 0.4% |
| 4 | 63.0% | 2.1% | 34.3% | 0.6% |

METHOD OF PREPARING FLEXIBLE CERAMIC MEMBRANE BY COMBINING MANGANESE OXIDE WITH LAYER-BY-LAYER ASSEMBLY TECHNOLOGY

CROSS REFERENCE OF RELATED APPLICATION

This is a non-provisional application which claimed priority of Chinese application number 2024101484405, filing date Feb. 1, 2024. The contents of the specification, including any intervening amendments thereto, are incorporated herein by reference.

BACKGROUND OF THE PRESENT INVENTION

Field of Invention

The present invention relates to drinking water purification and wastewater pollution control, and in particularly relates to a method for preparing a flexible ceramic membrane by combining manganese oxide with layer-by-layer assembly technology.

Description of Related Arts

Inorganic ceramic membranes have excellent mechanical, chemical and thermal stability and are resistant to chemical damage caused by the catalytic environment and physical damage during operation. However, the brittleness of ceramic membranes complicates the modification of inorganic ceramic membranes and increases the cost and energy consumption of the corresponding separation devices. At present, organic polymer membranes have become the most widely used substrates in the fabrication of catalytic membranes due to their excellent flexibility and plasticity. However, the active species generated during these catalytic reactions can not only degrade the adsorbed dirt, but also attack the polymer chains themselves, leading to membrane structure destruction and changes in membrane surface properties. The flexible ceramic nanomembrane is made by evenly dispersing nano-scale ceramic particles in a polymer matrix, which is a new composite material that combines ceramics and elasticity, opening up a new way to create material miracles. However, the problem is that the preparation process of flexible ceramic membranes is relatively complicated, involving multidisciplinary technologies such as sol chemistry, interface control, and sintering technology. The stability and repeatability of large-scale preparation in production still needs to be improved.

Compared with the limitations of blending and surface coating in preparing membranes with poor uniformity and stability, the bottom-up method is a new type of membrane preparation method. Different catalyst precursors react with each other under certain conditions, thereby forming active components in situ on the membrane matrix surface, improving the membrane filtration performance. Several bottom-up synthetic approaches have been developed, including chemical grafting, chemical vapor deposition, and layer-by-layer assembly techniques. In the chemical grafting process, the active groups on the membrane surface react with the catalyst precursor, and then the polymer chains of the precursor are covalently bonded to the membrane surface. However, this method has high catalyst consumption and often involves multiple complex reaction steps. Chemical vapor deposition is complex to operate and uneven deposition can lead to impurities or defects on the film surface, and there is a risk of toxic residual gas. The layer-by-layer assembly technique has the advantages of easy control of layer thickness and simple operation. It uses different polyelectrolytes to cover the membrane, alternately exposing the membrane to positively and negatively charged polyelectrolytes, and then forming a thin polyelectrolyte multilayer on the membrane. The membrane has a certain resistance to chlorination, but at the same time the method relies on multiple stages of manual operation and requires a large amount of polymer solution, which can cause equipment corrosion and secondary pollution. Therefore, the layer-by-layer assembly technology still needs to be further improved.

In general, bottom-up synthesis is the most promising technology for large-scale production of catalytic membranes due to the precise control over the thickness and density of the catalyst coating. Therefore, it is necessary to improve the dispersibility of organic skeleton-supported catalysts and the chlorination resistance of organic membranes through mild and stable modification methods and to reasonably combine different preparation methods such as impregnation and coating so as to develop new technologies for preparing flexible ceramic membranes more simply and efficiently.

SUMMARY OF THE PRESENT INVENTION

An object of the present invention is to solve the problem that the existing organic membranes have poor hydrophilicity and the ceramic membranes prepared using organic membranes have high costs, and to provide a method of preparing a flexible ceramic membrane by using manganese oxide to combine with layer-by-layer assembly technology.

The present invention utilizes the advantages of the polyelectrolyte layer's anti-chlorination property to make the modified membrane have the advantages of flexible ceramics, solving the problems of poor hydrophilicity of existing organic membranes and high cost of ceramic membranes, and intercepting colloidal substances in the water body based on the binding force of positive and negative charges to improve the problem of easy contamination during membrane operation, laying a foundation for its research in the field of drinking water purification and wastewater pollution control.

A method of preparing a flexible ceramic membrane by using manganese oxide combined with layer-by-layer assembly technology includes the following steps:

(a) Pretreatment of Organic Membrane:

Immerse an organic membrane in anhydrous ethanol, take out the organic membrane, rinse the membrane surface with deionized water and then immerse in deionized water to obtain a pretreated organic membrane.

(b) Preparing a Preformed Solution:

Add potassium hydroxide and potassium permanganate to deionized water, and stir to obtain a preformed solution.

(c) Introducing Polar Groups on the Surface of the Pretreated Organic Membrane:

Place the pretreated organic membrane in the preformed solution for a period of deposition time, then rinse with deionized water to remove excess preformed solution to obtain an organic membrane with polar groups.

(d) Preparing Polycationic Coating Solution:

Add polydimethyldiallyl ammonium chloride to deionized water and stir evenly to obtain a polycationic coating solution.

(e) Preparation of Coating Solution A and Coating Solution B:

(e.1) Add potassium permanganate to deionized water, stir evenly and react for a period of time to obtain potassium permanganate solution, which is coating solution A.

(e.2) Add manganese chloride to deionized water, stir evenly and react for a period of time to obtain a manganese chloride solution, which is coating solution B.

(f) Carry out In-Situ Layer-by-Layer Assembly:

(f.1) Immerse the organic membrane with polar groups in the polycation coating solution. After soaking for a period of time, rinse the organic membrane with polar groups with deionized water to remove excess polycation on the surface of the organic membrane with polar groups.

(f.2) Immerse the organic membrane with polar groups in the coating solution A, place on a shaking table to carry out reaction for a period of time, then take out the organic membrane with polar groups from the coating solution A and immerse the organic membrane with polar groups in the coating solution B, then place the organic membrane with polar groups on the shaking table and allow reaction to take place while on the shaking table so that the coating solution A and the coating solution B are fully in contact, then rinse with deionized water to remove excess manganese oxide particles on the surface of the organic membrane.

(g) Repeat step (f) for two to six times to obtain a modified organic membrane.

(h) Dry the modified organic membrane naturally and then store in deionized water, thereby a flexible ceramic membrane prepared by in-situ generation of manganese oxide combined with layer-by-layer assembly technology is obtained.

Principle of the Present Invention

The layer-by-layer assembly technique has the advantages of easy control of layer thickness and simple operation. The combination of catalyst precursor and membrane is based on the interaction between the two, such as hydrogen bonding, electrostatic attraction and coordination bonding. This technique uses different polyelectrolytes to cover the membrane, alternately exposing the membrane to positively and negatively charged polyelectrolytes, and then forming multilayer of thin polyelectrolyte on the membrane. The prepared nano manganese oxide has a negative charge, and the polydimethyldiallylammonium chloride has a positive charge, so the driving force of the present invention is the electrostatic interaction between molecules. On the one hand, the layer-by-layer assembly technology is believed to be able to withstand the chlorinated environment, and the organic membrane impregnated with the polyelectrolyte layer has a certain resistance to chlorination. On the other hand, nano manganese oxide has excellent hydrophilicity, which can improve the hydrophobicity of the organic membrane and the defects of the functional layer on the membrane surface, making the modified membrane have the advantages of both ceramic membrane and organic membrane. When charged colloidal particles enter the membrane pores and cause irreversible contamination of the membrane, the modified layer forms a barrier between the membrane and the pollutants through the electrostatic attraction of positive and negative charges, preventing the pollutants from passing through the membrane and improving the retention performance for pollutants of membrane. At the same time, the close bonding between manganese oxides can be achieved without solid-state sintering, which provides a new idea for manganese-based modified membranes.

In summary, after modification by manganese oxide combined with layer-by-layer assembly technology, the chlorination resistance, hydrophilicity and anti-fouling properties of the membrane can be improved, and it has a good application prospect.

The advantages of the present invention are as follows:

(1) According to the present invention, the modification method in combining the layer-by-layer assembly technology with manganese oxide preparation is a mild modification method, a tightly bonded manganese oxide layer is generated, and the modified layer on the membrane surface is relatively stable after modification.

(2). According to the present invention, the modification method in combining the layer-by-layer assembly technology with manganese oxide preparation is simple in preparation, controllable, short in cycle, and low in cost.

(3) According to the present invention, the modification method in combining the layer-by-layer assembly technology with manganese oxide preparation improves the chlorination resistance, hydrophilicity and dynamic fouling resistance of the hydrophobic organic membrane.

(4) According to the present invention, the prepared modified organic membrane does not require additional pressurization and energy consumption during the filtration process, and the filtration is achieved by gravity head drive.

DETAILED DESCRIPTION OF THE PREFERRED EMBODIMENT

Figure 1:
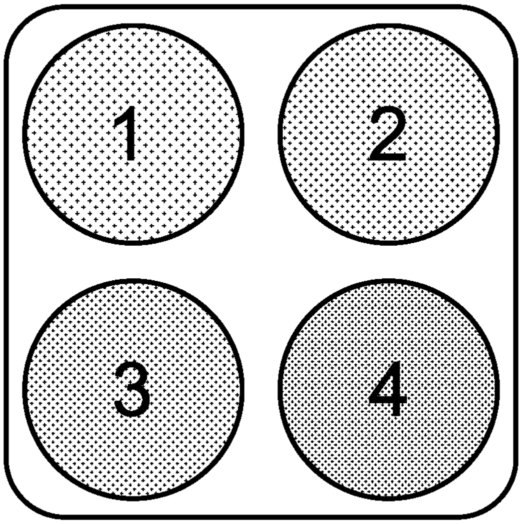
FIG. 1 illustrates an original membrane and modified membranes. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

The present invention is further described in detail below in the preferred embodiments, but it should not be construed as limiting the present invention. Without departing from the essence of the present invention, the modifications and replacements made to the methods, steps or conditions of the present invention all belong to the scope of the present invention.

Preferred Embodiment 1

According to this embodiment, a method of preparing a flexible ceramic membrane by using manganese oxide combined with layer-by-layer assembly technology includes the following steps:

(a) Pretreatment of Organic Membrane:

Immerse an organic membrane in anhydrous ethanol, take out the organic membrane, rinse the membrane surface with deionized water and then immerse in deionized water to obtain a pretreated organic membrane.

(b) Preparing a Preformed Solution:

Add potassium hydroxide and potassium permanganate to deionized water, and stir to obtain a preformed solution.

(c) Introducing Polar Groups on the Surface of the Pretreated Organic Membrane:

Place the pretreated organic membrane in the preformed solution for a period of deposition time, then rinse with deionized water to remove excess preformed solution to obtain an organic membrane with polar groups.

(d) Preparation of Polycationic Coating Solution:

Add polydimethyldiallyl ammonium chloride to deionized water and stir evenly to obtain a polycationic coating solution.

(e) Preparation of Coating Solution A and Coating Solution B (e.1) Add potassium permanganate to deionized water, stir evenly and react for a period of time to obtain potassium permanganate solution, which is the coating solution A.

(e.2) Add manganese chloride to deionized water, stir evenly and react for a period of time to obtain a manganese chloride solution, which is the coating solution B.

(f) Carry out In-Situ Layer-by-Layer Assembly:

(f.1) Immerse the organic membrane with polar groups in the polycation coating solution. After soaking for a period of time, rinse the organic membrane with polar groups with deionized water to remove excess polycation on the surface of the organic membrane with polar groups.

(f.2) Immerse the organic membrane with polar groups in the coating solution A, place on a shaking table to carry out reaction for a period of time, then take out from the coating solution A and immerse in the coating solution B, place on the shaking table and allow reaction to take place while on the shaking table so that the coating solution A and the coating solution B are fully contact, then rinse with deionized water to remove excess manganese oxide particles on the surface of the organic membrane.

(g) Repeat step (f) 2-6 times to obtain a modified organic membrane.

(h) Dry the modified organic membrane naturally and store in deionized water to obtain a flexible ceramic membrane prepared by in-situ generation of manganese oxide combined with layer-by-layer assembly technology.

Preferred Embodiment 2: The difference between this embodiment and the Preferred Embodiment 1 is that: step (a): the organic membrane is immersed in anhydrous ethanol for 1 min~2 min, then the organic membrane is taken out and rinsed with deionized water to remove anhydrous ethanol on the surface of the organic membrane, finally the organic membrane is immersed in deionized water for 24 hours to obtain a pretreated organic membrane. Other steps are the same as in the Preferred Embodiment 1.

Preferred Embodiment 3: The difference between this embodiment and the preferred embodiment 1 or 2 is that: in step (a), the organic membrane is one of an ultrafiltration membrane or a microfiltration membrane, and its material is a polytetrafluoroethylene membrane, a polyvinylidene fluoride membrane, a polyvinylidene fluoride membrane, a cellulose acetate membrane or a polyethersulfone membrane. Other steps are the same as in the preferred embodiment 1 or 2.

Preferred Embodiment 4: The difference between this embodiment and any one of the preferred embodiments 1-3 is that: in step (b), a concentration of the potassium hydroxide solution in the preformed solution is 2.0 mol/L~2.5 mol/L; a concentration of the potassium permanganate solution in the preformed solution is 0.15 mol/L~0.20 mol/L. Other steps are the same as in the preferred embodiments 1-3.

Preferred Embodiment 5: The difference between this embodiment and any one of the preferred embodiments 1-4 is that: in step (b), a volume ratio of potassium hydroxide solution to potassium permanganate solution is (1~1.2):(1~1.2); a stirring speed is 500 r/min~700 r/min and a stirring time is 20 min~30 min. Other steps are the same as in the preferred embodiments 1-4.

Preferred Embodiment 6: The difference between this embodiment and any one of the preferred embodiments 1-5 is that: in step (c), the pretreated organic membrane is placed in the preformed solution for 10 minutes~15 minutes under a deposition temperature of 50° C. Other steps are the same as in the preferred embodiments 1-5.

Preferred Embodiment 7: The difference between this embodiment and any one of the preferred embodiments 1-6 is that: in step (d), a concentration of polydimethyldiallylammonium chloride in the polycationic coating solution is 0.5 g/L~0.8 g/L. Other steps are the same as in the preferred embodiments 1-6.

Preferred Embodiment 8: The difference between this embodiment and any one of the preferred embodiments 1-7 is that: in step (e.1), a concentration of the potassium permanganate solution is 40 μmol/L~80 μmol/L; and the reaction time after the stirring is uniform is 10 min~20 min. Other steps are the same as in the preferred embodiments 1-7.

Preferred Embodiment 9: The difference between this embodiment and any one of the preferred embodiments 1-8 is that: in step (e.2), a concentration of the manganese chloride solution is 60 μmol/L~120 μmol/L; and the reaction time after the stirring is uniform is 10 min~20 min. Other steps are the same as in the preferred embodiments 1-8.

Preferred Embodiment 10: The difference between this embodiment and any one of the preferred embodiments 1-9 is that: in step (f.1), the organic membrane with polar groups is immersed in the polycationic coating solution for 20 min~40 min; and in step (f.2), the organic membrane is immersed in the coating solution A, is placed on the shaking table to carry out reaction for 10 minutes~20 minutes, then is taken out from the coating solution A and is immersed in the coating solution B, is placed on the shaking table to carry out reaction for 10 minutes~20 minutes. Other steps are the same as in the preferred embodiment 1-9.

The present invention will be described in detail below in conjunction with the following exemplary embodiments and the beneficial effects of the present invention are verified through the following exemplary embodiments.

Exemplary Embodiment 1

According to this exemplary embodiment, a method of preparing a flexible ceramic membrane by using manganese oxide combined with layer-by-layer assembly technology includes the following steps:

(a) Pretreatment of Organic Membrane:

Immerse an organic membrane in anhydrous ethanol for 1 minute, take out the organic membrane, then rinse the surface of the membrane with deionized water to remove the anhydrous ethanol on the surface, and finally immerse the membrane in deionized water to obtain a pretreated organic membrane.

In step (a), the organic membrane is Polyvinylidene fluoride membrane (PVDF microfiltration membrane).

(b) Preparing a Preformed Solution:

Add potassium hydroxide and potassium permanganate to deionized water, and stir at a speed of 700 r/min for 30 minutes to obtain the preformed solution.

In step (b), a concentration of potassium hydroxide solution in the preformed solution is 2.3 mol/L.

In step (b), a concentration of potassium permanganate solution in the preformed solution is 0.19 mol/L.

(c) Introducing Polar Groups on the Surface of the Pretreated Organic Membrane:

Place the pretreated organic membrane in the preformed solution for a deposition time of 10 minutes at a deposition temperature of 50° C., then rinse with deionized water to remove the preformed solution in excess to obtain an organic membrane with polar groups.

(d) Preparation of Polycationic Coating Solution:

Add polydimethyldiallyl ammonium chloride to deionized water and stir evenly to obtain a polycationic coating solution.

In step (d), a concentration of polydimethyldiallyl ammonium chloride in the polycationic coating solution is 0.5 g/L.

(e) Preparation of Coating Solution A and Coating Solution B:

(e.1) Add potassium permanganate to deionized water, stir evenly and then react for 15 minutes to obtain a potassium permanganate solution, which is the coating solution A.

In step (e.1), a concentration of the potassium permanganate solution is 40 μmol/L.

(e.2) Add manganese chloride to deionized water, stir evenly and then react for 15 minutes to obtain a manganese chloride solution, which is the coating solution B.

In step (e.2), a concentration of the manganese chloride solution is 60 μmol/L.

(f) Carry out In-Situ Layer-by-Layer Assembly:

(f.1) Immerse the organic membrane with polar groups in the polycation coating solution. After soaking for 30 minutes, rinse the organic membrane with polar groups with deionized water to remove excess polycation from the surface of the organic membrane with polar groups.

(f.2) Immerse the organic membrane with polar groups in the coating solution A, react on a shaking table for 15 minutes, then take out from the coating solution A and immerse in the coating solution B, carry out reaction on the shaking table for 15 minutes so that the coating solution A and the coating solution B are fully contact, then rinse with deionized water to remove excess manganese oxide particles from the surface of the organic membrane.

(g) Repeat step (f) for 2 times to obtain a modified organic membrane.

(h) Dry the modified organic membrane naturally and store in deionized water to obtain a flexible ceramic membrane prepared by in-situ generation of manganese oxide combined with layer-by-layer assembly technology.

In Exemplary Example 1, the flexible ceramic membrane prepared by using manganese oxide combined with layer-by-layer assembly technology has an initial contact angle of 45.8°, and a contact angle of 24.1° after 30 seconds.

Exemplary Embodiment 2: The difference between this embodiment and Exemplary Embodiment 1 is that: in step (g), step (f) is repeated 4 times. Other steps and parameters are the same as those in Exemplary Embodiment 1.

In Exemplary Example 2, the flexible ceramic membrane prepared by using manganese oxide combined with layer-by-layer assembly technology has an initial contact angle of 34.3°, and a contact angle of 0.0° after 20 seconds.

Exemplary Embodiment 3: The difference between this embodiment and Exemplary Embodiment 1 is that: in step (g), step (f) is repeated 6 times. Other steps and parameters are the same as those in Exemplary Embodiment 1.

In Exemplary Example 3, the flexible ceramic membrane prepared by using manganese oxide combined with layer-by-layer assembly technology has an initial contact angle of 29.3°, and a contact angle of 0.0° after 11 seconds.

FIG. 1 illustrates the an original membrane and modified membranes. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

From the illustration of FIG. 1, which is a graphical illustration of a photograph of the original membrane and modified membranes obtained from Exemplary Embodiments 1, 2, and 3, it can be seen that as the number of in-situ layer-by-layer assembly increases, the color of the membrane gradually deepens.

Figure 2:
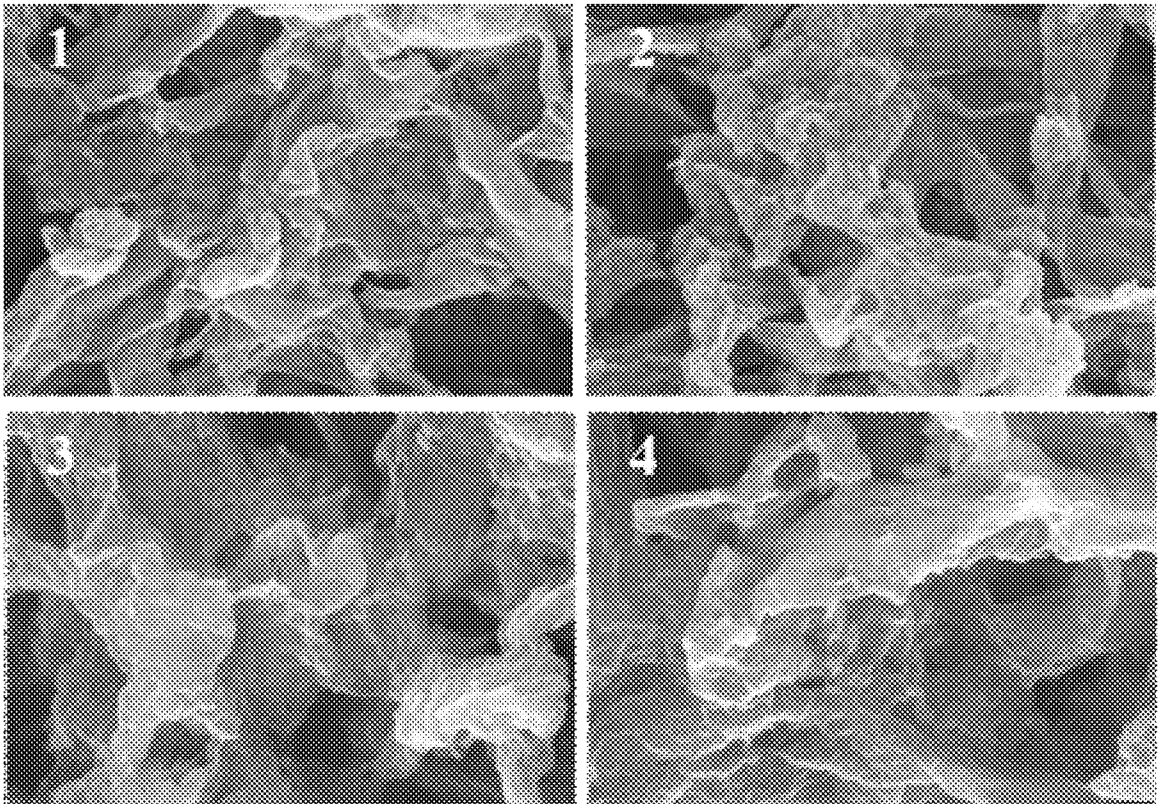
FIG. 2 illustrates the SEM images of the original membrane and the modified membrane. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

FIG. 2 illustrates the SEM images of the original membrane and the modified membrane. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

It can be seen from FIG. 2 that the surface of the original PVDF microfiltration membrane is relatively smooth. After two layers of in-situ layer-by-layer assembly, a uniform layer of spherical particles attached to the surface of the membrane can be observed at the nanoscale, which are presumably manganese oxide particles generated in situ. After assembling 4 and 6 layers of modification solution in situ, the membrane surface changed from the original granular state to a sheet-like structure. As the number of assembled layers increased, the thickness of the modified layer increased.

Figures 3, 4:
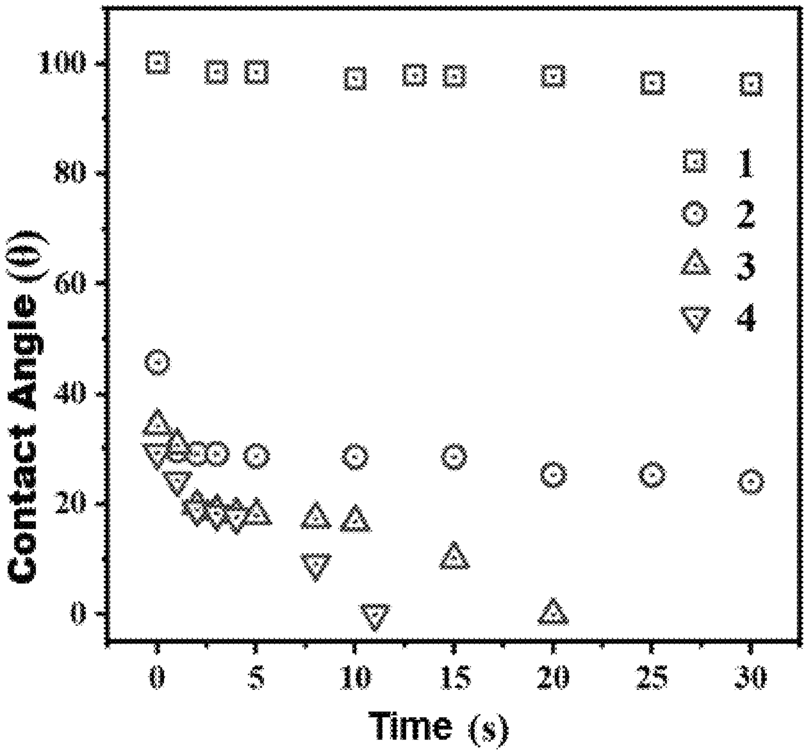
FIG. 3 illustrates the element distribution of the original membrane and the modified membrane. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.
FIG. 4 is an illustration of the dynamic contact angle of the original membrane and the modified membrane. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

FIG. 3 illustrates the element distribution of the original membrane and the modified membrane. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

It can be seen from FIG. 3 that there is no Mn element on the surface of the original PVDF microfiltration membrane. After in situ layer-by-layer assembling 2, 4 and 6 layers of modification solution, the surface Mn element gradually increases. Combined with the SEM image, it is further confirmed that the manganese oxide particles are successfully coated on the surface of the original PVDF microfiltration membrane.

FIG. 4 is an illustration of the dynamic contact angle of the original membrane and the modified membrane. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

It can be seen from FIG. 4 that: The PVDF microfiltration membrane shows strong hydrophobicity, and its water contact angle is stable at about 97.8°. After in situ assembling two (2) layers, the hydrophilicity is greatly improved, and its initial water contact angle is 45.8°, which drops to 24.1° after 30 seconds. At this point, a certain degree of hydrophobicity is still maintained. This is because MnOx is hydrophilic, but the amount of MnOx attached to the membrane surface is relatively limited, and the surface energy of the hydrophobic membrane cannot be significantly reduced. After in situ assembling four (4) layers, its initial water contact angle is 34.3°, which drops to 0° after 20 seconds. After in situ assembling six (6) layers, its initial water contact angle is 29.3°, which drops to 0° after 11 seconds. It shows that in situ assembling different numbers of layers of modification solution of manganese oxide particles can significantly improve the wettability of organic membrane.

Figure 5:
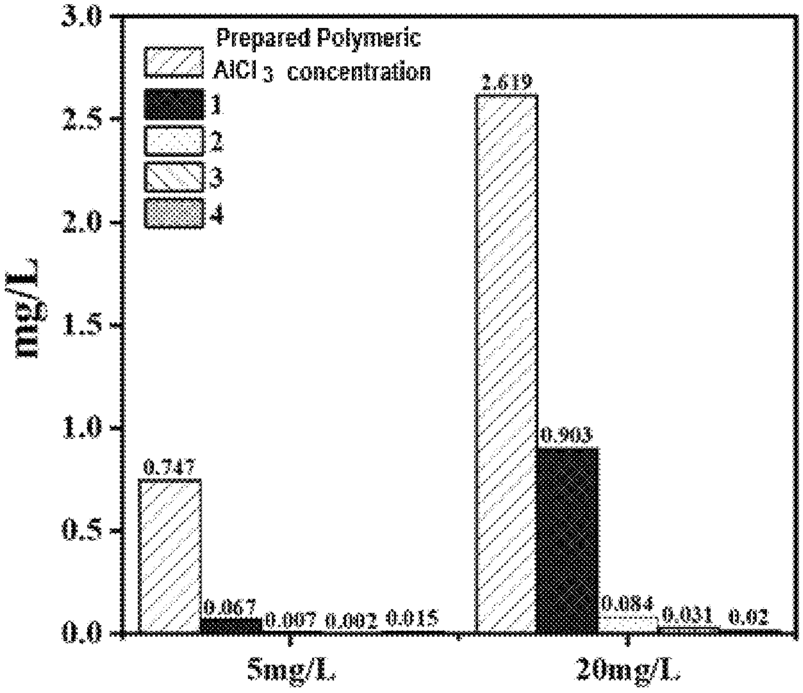
FIG. 5 illustrates the Interception Chart of $Al^{3+}$ colloidal particles. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

FIG. 5 illustrates the Interception Chart of $Al^{3+}$ colloidal particles. In this figure, the numerical reference 1 refers to the original PVDF microfiltration membrane, the numerical reference 2 refers to the flexible ceramic membrane prepared by combining manganese oxide with layer-by-layer assembly technology in Exemplary Embodiment 1, the numerical reference 3 refers to the flexible ceramic membrane prepared by combining manganese oxide with layer-by-layer assembly technology in Exemplary Embodiment 2, the numerical reference 4 refers to the flexible ceramic membrane prepared by combining manganese oxide with layer-by-layer assembly technology in Exemplary Embodiment 3.

The preparation of pollutant has the following steps: Add polyaluminium chloride at 5 mg $Al^{3+}$/L and 20 mg $Al^{3+}$/L to 1000 mL deionized water respectively, adjust pH to 7 and stir evenly to obtain an $Al^{3+}$ colloidal particle contaminated liquid. The filtration experiment is conducted by dead-end filtration, and the transmembrane pressure difference is 17 cm gravity head. After testing the $Al^{3+}$ in the effluent, it is found that when the raw water contained 5 mg/L of polyaluminium chloride, the PVDF microfiltration membrane can intercept 90% of $Al^{3+}$. However, when the initial polyaluminium chloride concentration increases to 20 mg/L, the interception rate of the original membrane decreases to 65%. By comparison, it is found that the modified flexible ceramic membrane can significantly improve the interception of $Al^{3+}$. This is because the surface of MnOx is negatively charged and the surface of the polycation is positively charged, and the $Al^{3+}$ colloidal particles are intercepted by the electrostatic attraction between the positive and negative charges between the layers. From this, it can be determined that the anti-fouling properties of the flexible ceramic membrane modified by manganese oxide combined with layer-by-layer assembly technology is enhanced.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A method of preparing a flexible ceramic membrane by combining manganese oxide with layer-by-layer assembly technology, characterized in that, said method comprising the steps of:

(a) Carrying out pretreatment of an organic membrane, which comprises the steps of:

immersing an organic membrane in anhydrous ethanol, taking out the organic membrane, rinsing a surface of the organic membrane with deionized water and then immersing in deionized water to obtain a pretreated organic membrane (b) preparing a preformed solution, which comprises the steps of:

adding potassium hydroxide and potassium permanganate to deionized water, and stirring to obtain a preformed solution;

(c) introducing polar groups on the surface of the pretreated organic membrane, which comprises the steps of:

placing the pretreated organic membrane in the preformed solution for a period of deposition time, then rinsing with deionized water to remove the preformed solution in excess to obtain an organic membrane with polar groups;

(d) Preparing a polycationic coating solution, which comprises the steps of:

adding polydimethyldiallyl ammonium chloride to deionized water and stirring evenly to obtain a polycationic coating solution;

(e) Preparing coating solution A and coating solution B, which comprises the steps of:

(e.1) adding potassium permanganate to deionized water, stirring evenly and carrying out reaction for a period of time to obtain potassium permanganate solution, which is the coating solution A;

(e.2) adding manganese chloride to deionized water, stirring evenly and carrying out reaction for a period of time to obtain manganese chloride solution, which is the coating solution B;

(f) Carrying out in-situ layer-by-layer assembly, which comprises the steps of:

(f.1) immersing the organic membrane with polar groups in the polycation coating solution, after soaking for a period of time, rinsing the organic membrane with polar groups with deionized water to remove the polycation in excess on the surface of the organic membrane with polar groups;

(f.2) immersing the organic membrane with polar groups in the coating solution A, carrying out reaction for a period of time while positioning on a shaking table, then taking out the organic membrane with polar groups from the coating solution A and immersing in the coating solution B, carrying out reaction for a period of time while positioning on the shaking table, thereby the coating solution A and the coating solution B are fully contact, then rinsing with deionized water to remove excess manganese oxide particles on the surface of the organic membrane with polar groups;

(g) repeating step (f) 2-6 times to obtain a modified organic membrane; and (h) drying the modified organic membrane naturally and storing in deionized water, thereby a flexible ceramic membrane prepared by in-situ generation of manganese oxide combined with layer-by-layer assembly technology is obtained.

2. The method of preparing a flexible ceramic membrane by combining manganese oxide with layer-by-layer assembly technology according to claim 1, characterized in that, in step (a), the organic membrane is immersed in anhydrous ethanol for 1 min~2 min, then the organic membrane is taken out, rinsed with deionized water to remove anhydrous ethanol on the surface, and immersed in deionized water for 24 hours, thereby the pretreated organic membrane is obtained.

3. The method of preparing a flexible ceramic membrane by combining manganese oxide with layer-by-layer assembly technology according to claim 1, characterized in that, in step (a), the organic membrane is an ultrafiltration membrane or a microfiltration membrane, and the organic membrane is selected from the group consisting of a polytetrafluoroethylene membrane, a polyvinylidene fluoride membrane, a polyvinylidene fluoride membrane, a cellulose acetate membrane and a polyethersulfone membrane.

4. The method of preparing a flexible ceramic membrane by combining manganese oxide with layer-by-layer assembly technology according to claim 1, characterized in that, in step (b), a concentration of the potassium hydroxide solution in the preformed solution is 2.0 mol/L~2.5 mol/L; and a concentration of the potassium permanganate solution in the preformed solution is 0.15 mol/L~0.20 mol/L.

5. The method of preparing a flexible ceramic membrane by combining manganese oxide with layer-by-layer assembly technology according to claim 1, characterized in that, in step (b), a volume ratio of potassium hydroxide solution to potassium permanganate solution is (1~1.2):(1~1.2); a stirring speed is 500 r/min~700 r/min and a stirring time is 20 min~30 min.

6. The method of preparing a flexible ceramic membrane by combining manganese oxide with layer-by-layer assembly technology according to claim 1, characterized in that, in step (c), the pretreated organic membrane is placed in the preformed solution for 10 minutes~15 minutes under a deposition temperature of 50° C.

7. The method of preparing a flexible ceramic membrane by combining manganese oxide with layer-by-layer assembly technology according to claim 1, characterized in that, in step (d), a concentration of polydimethyldiallylammonium chloride in the polycationic coating solution is 0.5 g/L~0.8 g/L.

8. The method of preparing a flexible ceramic membrane by combining manganese oxide with layer-by-layer assembly technology according to claim 1, characterized in that, in step (e.1), a concentration of the potassium permanganate solution is 40 μmol/L~80 μmol/L; and the reaction time after the stirring is uniform is 10 min~20 min.

9. The method of preparing a flexible ceramic membrane by combining manganese oxide with layer-by-layer assembly technology according to claim 1, characterized in that, in step (e.2), a concentration of the manganese chloride solution is 60 μmol/L~120 μmol/L; and the reaction time after the stirring is uniform is 10 min~20 min.

10. The method of preparing a flexible ceramic membrane by combining manganese oxide with layer-by-layer assembly technology according to claim 1, characterized in that, in step (f.1), the organic membrane with polar groups is immersed in the polycationic coating solution for 20 min~40 min; and in step (f.2), the organic membrane is immersed in the coating solution A, and the reaction is carried out on the shaking table for 10 minutes~20 minutes, then the organic membrane with polar groups is taken out from the coating solution A and is immersed in the coating solution B, and the reaction is carried out on the shaking table for 10 minutes~20 minutes.

* * * * *